(12) United States Patent
Lindoff et al.

(10) Patent No.: US 8,009,595 B2
(45) Date of Patent: Aug. 30, 2011

(54) USER CONTROLLED TRANSMIT POWER CONTROL DURING HANDOVER IN A CDMA SYSTEM

(75) Inventors: Bengt Lindoff, Bjärred (SE); Torgny Palenius, Barsebäck (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 428 days.

(21) Appl. No.: 11/721,674

(22) PCT Filed: Dec. 16, 2005

(86) PCT No.: PCT/EP2005/013563
§ 371 (c)(1),
(2), (4) Date: Sep. 22, 2009

(87) PCT Pub. No.: WO2006/063842
PCT Pub. Date: Jun. 22, 2006

(65) Prior Publication Data
US 2010/0002654 A1    Jan. 7, 2010

Related U.S. Application Data

(60) Provisional application No. 60/638,768, filed on Dec. 22, 2004.

(30) Foreign Application Priority Data

Dec. 16, 2004 (EP) ..................................... 04029822

(51) Int. Cl.
*H04B 7/00* (2006.01)
(52) U.S. Cl. ....................................................... 370/310
(58) Field of Classification Search ........................ None
See application file for complete search history.

(56) References Cited

U.S. PATENT DOCUMENTS 5,901,354 A * 5/1999 Menich et al. ................ 455/442
(Continued)

FOREIGN PATENT DOCUMENTS

EP    1 223 769 A    7/2002
(Continued)

OTHER PUBLICATIONS

PCT International Search Report, mailed Mar. 27, 2006, in connection with International Application No. PCT/EP2005/013563.

(Continued)

*Primary Examiner* — Chi H Pham
*Assistant Examiner* — Fan Ng
(74) *Attorney, Agent, or Firm* — Potomac Patent Group PLLC

(57) ABSTRACT

A method and device for controlling a mobile user equipment being in radio communication with base stations of a wireless communication system. The transmit power of the user equipment is controlled by the communication system. Immediately before sending an event message by the user equipment, the transmit power is increased by the user equipment, in order to increase the likelihood that the message is properly received by the base station. The message may be a soft handover event message. The transmit power is increased by opening a closed loop power control circuit, which normally controls the transmit power of the user equipment. By opening the closed loop circuit, the user equipment takes over the control of its transmitted power for increase thereof. Following the sending of the message, the user equipment may control the base station to send with increased power by increasing a target signal-to-interference ratio value ($SIR_{ref}$) by means of which the base station power level is controlled. In this way, the likelihood of receiving any acknowledgement messages and event messages from the base station is increased.

41 Claims, 5 Drawing Sheets

U.S. PATENT DOCUMENTS

| | | | |
|---|---|---|---|
| 6,055,427 A | 4/2000 | Ojaniemi et al. | |
| 6,144,861 A | 11/2000 | Sundelin et al. | |
| 6,311,075 B1* | 10/2001 | Bevan et al. | 455/562.1 |
| 6,366,778 B1* | 4/2002 | Bender et al. | 455/442 |
| 6,418,320 B2* | 7/2002 | Yoshida et al. | 455/522 |
| 6,999,784 B1* | 2/2006 | Choi | 455/522 |
| 7,190,964 B2* | 3/2007 | Damnjanovic et al. | 455/522 |
| 2003/0142647 A1* | 7/2003 | Agrawal et al. | 370/331 |
| 2010/0002654 A1* | 1/2010 | Lindoff et al. | 370/332 |

FOREIGN PATENT DOCUMENTS

| | | |
|---|---|---|
| WO | 03/077584 A1 | 9/2003 |

OTHER PUBLICATIONS

Holma, H. and Toskala, A. "WCDMA for UTMS Radio Access for Third Generation Mobile Communications" John Wiley & Sons, Ltd, England, 2004, pp. 58-60 and 237-260.

\* cited by examiner

USER CONTROLLED TRANSMIT POWER CONTROL DURING HANDOVER IN A CDMA SYSTEM

CROSS-REFERENCE TO RELATED APPLICATIONS

This application claims the benefit of U.S. Provisional Application No. 60/638,768 filed Dec. 22, 2004, which is hereby incorporated herein by reference in its entirety. This application also claims priority under 35 U.S.C. §119 to European Patent Application No. 04029822.6, filed Dec. 16, 2004, which is hereby incorporated herein by reference in its entirety.

AREA OF INVENTION

The present invention relates to methods and apparatuses for improved stability of handover messages in a wireless communication system.

BACKGROUND OF INVENTION

A communication system may comprise several base stations each covering a cell area. The base stations, BS, may be connected to a Radio Network Controller, RNC. Several User Equipments, UE, may be located within the cell areas of the base stations.

In a Code Division Multiple Access CDMA system, communication takes place simultaneously for several UE:s over the same carrier frequency. Each UE has a separate channel defined by a user specific code over which communication takes place, according to methods well known in the art. Each UE contributes to the interference in said system. Thus, there is a desire to keep the power emitted from each UE as low as possible, while still maintaining satisfactory quality of the transmission.

One possibility to achieve such power control of the UE is by controlling the up-link transmit power from the UE:s so that a specific Bit Error Rate BER or Block Error Rate BLER of the received signal at the base station is obtained. This may be performed by determining a target Signal-to-Interference ratio SIR at the base station side corresponding to the required BER or BLER. An Outer Loop Power Control OLPC system may be arranged for determining such target SIR. The target SIR may be influenced by several factors, such as the travel speed of the UE and multipath signal propagation. The OLPC system may be relatively slow, with a frequency of update of for example 10 to 100 Hz for WCDMA (Wideband Code Division Multiple Access).

If the received signal at the BS from the UE has a SIR, which is above said target SIR, this is an indication that the UE is transmitting with unnecessarily high power. Then, the base station may send a signal to the UE to decrease the power. This may be performed by an inner loop power control also called a Fast Closed Loop Power Control FCL PC. This Power Control may operate with a frequency of update of for example 1.5 kHz for WCDMA. If the SIR is lower than the target SIR, the base station sends a signal requesting the UE to increase its power, and vice versa. Of course, the power can only be increased up to a certain upper limit.

In the same way, the reception of the signal transmitted by the base station is analyzed at the UE and the SIR of this signal is compared with a target SIR, and a signal is sent by the UE to the base station to increase the power, if the SIR is below the target SIR and vice versa.

Each base station may transmit a pilot signal on a Common PIlot CHannel CPICH. The signal strength of this pilot signal at the UE determines if the base station qualifies for being included in a list of active base stations maintained by each UE. The active list may be updated when the signal strength of a base station exceeds or is below certain values as described in more detail below. The list of active base stations may be limited to a specific number of base stations, for example six base stations.

When a specific UE moves from a cell area towards an adjacent cell area, the signal strengths from the base stations vary. When for example the signal strength of a specific base station becomes too low, or the signal strengths of another base station exceeds the signal strength of the specific base station, a handover situation may arise. There may be a soft handover or a hard handover.

In a hard handover situation, the UE may communicate with a single BS at each moment in time. If the signal strength of that BS, as determined by the pilot signal, decreases below a certain level, and another BS is available with a higher signal strength, the UE or BS initiate a hard handover event, in which the communication from and to an UE is transferred from one BS to a new BS.

In a WCDMA system, soft handover is foreseen. In soft handover the UE communicates with several BS:s simultaneously, which are within the reach of the UE. All signals received by the BS:s are delivered to the Radio Network Controller RNC, which may select the best signal among the signals received at the BS:s or combine the signals received at the BS:s.

The UE maintains a list of active BS:s, selected according to certain criteria as mentioned in more detail below. The UE receives the same messages from all BS:s included in the active list and combines these signals. Thus, a better reception may be obtained compared to receiving signals from a single BS, especially if there are several base stations with approximately equal signal strengths.

The above-mentioned system is disclosed in for example a book with the title: "WCDMA FOR UMTS Radio Access For Third Generation Mobile Communications" edited by Harri Holma and Antti Toskala.

WO 03/077584 discloses a device for controlling the power in an asymmetric soft handover condition in a communication network. The communications between the mobile station and the base station take place concurrently via two interface channels downlink from each base station separately. In uplink direction, the code channel of the mobile station is received by both base stations, but the received data is then routed to the associated radio network controller RNC for combining. Then, the RNC selects the better communication between the two possible radio links, and this selection takes place periodically.

EP 1223769 discloses a method for controlling uplink transmission power in a handover region by a UE in communication with a Node B using an FCS scheme. The UE stores TPC commands received for a specific duration from a plurality of cells in an active set, if the UE enters in the handover region during communication with a current best cell. If a next best cell is selected from the plurality of the cells, the UE determines a transmission power offset by comparing TPC commands from the current best cell with TPC commands from the next best cell for the specific duration at a time point where the best cell is changed from the current best cell to the next best cell. The UE transmits initial transmission power for the next best cell at a transmission power level determined considering the transmission power offset.

In cellular systems like WCDMA all users share the same radio resource. In order to optimize the system capacity, power control is introduced, as mentioned above, such that all users use sufficient power in order to reach sufficiently good Quality of Service. On the physical layer this is measured as block errors and typically a user should use only so much power that e.g. 1% of the blocks are erroneously received, nothing more nothing less. How much power a mobile terminal (UE) may use is often defined through requirements in the specifications.

Another feature of WCDMA, as well as other cellular systems like GSM, is mobility, i.e. the possibility to do calls when moving around for instance in a car. In such scenarios, handover is important. Furthermore, the handover should be reliable, i.e. when a UE or base station signals a handover to another base station, the handover message as well as the handover procedure should work. If a handover fails, the call may be dropped.

In order to reduce the drop probability in handover scenarios, the handover messages are often sent in acknowledge mode. That means that if a handover message was erroneously received, for instance in the base station, that information is fed back to the UE that makes a retransmission. However, retransmissions means delays, typically in the order of a second. In high speed scenarios, e.g. in a car driving on a highway, when the signal strength is very weak and a new stronger cell is detected and a handover message is transmitted from the UE, delays due to retransmissions might imply that the UE goes out-of-sync, i.e. loses the (down-link) connection to the old base station, before the handover procedure is finalized. This may cause dropped calls.

Another risk, especially seen in WCDMA systems where only sufficient output power from the UE is allowed, is that the base station goes out-of-sync, i.e. loses the (up-link) connection to the UE. In such a scenario, the base station does not receive the handover message at all, and therefore does not ask for retransmission. Again a dropped call may be the result.

Hence, there are needs for methods and apparatuses that increase the probability of received and correctly detected handover messages and therefore make cellular system like WCDMA more robust.

SUMMARY OF INVENTION

An object of the invention is to provide methods and devices for handover in a communication system whereby loss of the connection between the mobile unit and the base station is mitigated.

According to a first aspect, there is provided a method for controlling a transmit power of a mobile user equipment being in radio communication with at least one base station of a wireless communication system, wherein the transmit power of the user equipment is normally controlled by the communication system via power control commands. The method comprises increasing the transmit power emitted by the user equipment before or during sending of a message to a base station, the message requesting an action in the communication system and requiring a response from the base station, said increasing being performed by the user equipment, substantially ignoring said power control commands from the base station until the message has been sent, and resuming normal operation, in the user equipment, by following the power control commands of the communication system before performing said requested action.

The message may request a soft or hard handover event.

In one embodiment of the invention, the transmit power of the user equipment may be controlled by a closed loop power control system, arranged so that the transmission results in a signal-to-interference ratio value equal to a target signal-to-interference ratio value, in which case the closed loop power control system is adjusted into an open loop power control system, for increasing the transmit power.

In another embodiment, the power control system may emit power control signals for increasing (TPC=1) or decreasing (TPC=0) the power emitted by the user equipment. In order to initially increase the transmit power during open loop control, the user equipment may generate a number of power increase signals (TPC=1). Moreover, the user equipment, for substantially ignoring said power control commands may include generating a toggling signal of alternating increase (TPC=1) and decrease (TPC=0) signals after the initial increase of the transmit power, for maintaining the transmit power at a substantially constant value.

In a further embodiment, the open loop system may cause an increase of the transmit power in response to reception of an increase signal (TPC=1) from the base station but may fail to cause a decrease of the transmit power in response to reception of a decrease signal (TPC=0) from the base station.

In a still further embodiment, the power level transmitted by a base station may be increased during a time period following sending of the message. The increase of the power level transmitted by the base station may be returned to the original power level after receipt of the response message or after a predetermined maximum time period. For increasing the power level transmitted by the base station, the user equipment may increase a target signal-to-interference ratio value for the base station. The target signal-to-interference ratio value may be increased by a predetermined amount. Alternatively, the target signal-to-interference ratio value may be increased adaptively, depending on at least one of a Bit Error Rate (BER), a Block Error Rate (BLER), and the present target signal-to-interference ratio value.

The communication system may be a Code Division Multiple Access system or a Wideband Code Division Multiple Access system.

In a still further embodiment, the increase of the transmit power may be performed if the signal strength of at least one base station in communication with said user equipment is below a threshold value. The increase of the transmit power may also be performed if the signal strengths of at least two or all base stations in communication with said user equipment are below a threshold value.

In yet another embodiment, the user equipment may comprise a list of active base stations, which are in communication with said user equipment. The increase of the transmit power may be performed if said message is a handover message for adding a base station to said list of active base stations (1A), or a handover message for a combined addition and removal of a base station to said list of active base stations (1C).

In another aspect, there is provided a device for controlling a transmit power of a mobile user equipment being in communication with at least one base station of a wireless communication system, wherein the transmit power of the user equipment is normally controlled by the communication system via power control commands, comprising: a power control unit for increasing the transmit power emitted by the user equipment before or during sending of a message to a base station, the message requesting an action in the communication system and requiring a response from the base station, said increasing being performed by the user equipment, and for substantially ignoring said power control commands from the base station until the message has been sent, and for resuming normal operation before performing said requested action by following the power control commands of the communication system.

The power control system for control of the transmit power of the user equipment may control the power in a closed loop circuit. The device may comprise a switch unit for opening the loop of the closed loop power control system. The message may be a message initiating or requesting a soft or hard handover event.

In an embodiment, the switch unit may comprise a first switch for opening the closed loop and increasing the transmit power; and a second switch for maintaining the increased power during a time sufficient for sending the message. The device may further comprise a toggling device for emitting toggling signals for toggling the transmit power up and down around the increased transmit power.

In another embodiment, the closed loop power control system may comprise a receiver circuit for receiving a power control signal (TPC) from a base station and a control circuit for increasing or decreasing the transmit power of the user equipment in dependence of the power control signal. The control circuit for increasing the transmit power may comprise a generator circuit for generating a number of power increase signals (TPC=1) for increasing the transmit power of the user equipment. The control circuit may further comprise a toggling circuit for maintaining the increased power during a time sufficient for sending the message, the toggling circuit comprising a delay circuit, a NOT circuit and an OR circuit.

In a further embodiment, the device may further comprise a power control unit for increasing a power level transmitted by a base station during a time period following sending of the message. The power control unit may be arranged to return the power level transmitted by the base station to the original power level after receipt of the response message or after a predetermined maximum time period.

In a still further embodiment, the device may comprise a register in the user equipment including a target signal-to-interference ratio value, and a control unit for increasing the power level transmitted by the base station by increasing the target signal-to-interference ratio value. The signal-to-interference ratio value may be increased by a predetermined amount. Alternatively, the target signal-to-interference ratio value may be increased adaptively, depending on at least one of a Bit Error Rate (BER), a Block Error Rate (BLER), and the present target signal-to-interference ratio value.

The communication system may be a Code Division Multiple Access system or a Wideband Code Division Multiple Access system.

In yet another embodiment, the power control unit may be arranged to increase the transmit power if the signal strength of at least one base station in communication with said user equipment is below a threshold value. The power control unit may be arranged to increase the transmit power if the signal strengths of at least two or all base stations in communication with said user equipment are below a threshold value.

The user equipment may comprise a list of active base stations, which are in communication with said user equipment. The power control unit may be arranged to increase the transmit power if said message is a handover message for adding a base station to said list of active base stations (1A), or a handover message for a combined addition and removal of a base station to said list of active base stations (1C).

In a further aspect, there is provided a computer program product comprising computer program code means to execute the methods mentioned above, when the computer program code means is run by an electronic device having computer capabilities. The computer program code means may be embodied on a computer readable medium.

In a still further aspect, there is provided a computer for performing the computer program product mentioned above.

BRIEF DESCRIPTION OF THE DRAWINGS

Further objects, features and advantages of the invention will become apparent from the following detailed description of embodiments of the invention with reference to the drawings, in which.

DETAILED DESCRIPTION OF EMBODIMENTS OF THE INVENTION

Figure 1:
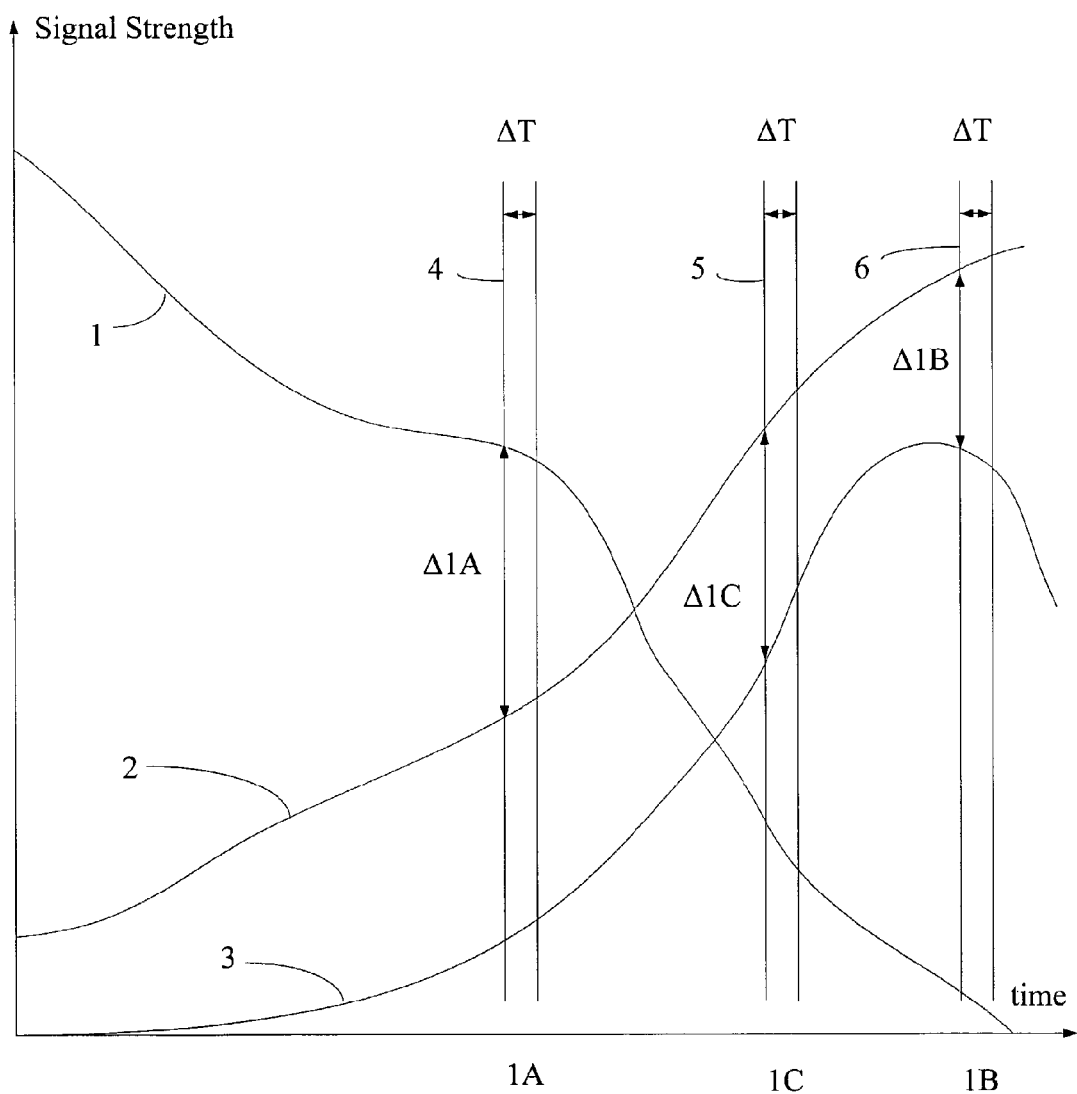
FIG. 1 is a diagram over signal strengths from base stations.

A scenario in which the present invention may be used is depicted in FIG. 1. A mobile unit, UE, is moving in an area covered by three cells, cell 1, cell 2 and cell 3. The pilot signal strengths of the three cells are indicated in the diagram by each of the curves 1, 2 and 3. Moreover, the diagram shows three events called 1A, 1B and 1C.

To the left in the diagram, the UE is connected to the BS of cell 1. After some time, the pilot signal strength of the BS of cell 2 has increased. At a certain time, indicated by line 4, the signal strength of cell 2 is approaching that of cell 1 and the difference is less than Δ1A (e.g. Reporting_range minus Hysteresis_event1A). Then, after a time period ΔT, the BS of cell 2 is added to the list of active BS:s in the UE, if the signal strength difference is still less than Δ1A. This is called a 1A event.

After some further time, as indicated by line 5, the signal strength of cell 1 decreases below the signal strength of cell 3 by a difference equal to Δ1C (e.g. Hysteresis_event1C). Then a combined Radio Link Addition and Removal is initiated. The BS of cell 1 is removed from the active list and replaced by the BS of cell 3. This is called a 1C event.

After some further time, as indicated by line 6, the pilot signal strength of cell 3 decreases below the signal strength of cell 2, both included in the active set of the UE, by a difference exceeding Δ1B (e.g. Reporting_range plus Hysteresis_event1B), for at least a time period of ΔT. Then, the weakest BS (i.e. that of cell 3) is removed from the active list of BS:s of the UE. This is called a 1B event.

The above information appears in the above-mentioned book edited by Harri Holma and Antti Toskala.

In certain situations, there is a risk that handover messages transmitted from the UE (or the base station) do not reach the base station (or UE). In order to safeguard the transmission during such handover messages, some embodiments of the invention let the UE increase the output power above the power level established by the closed loop power control system during the time of transmitting the important handover message as described in more detail below. This may take place when the signal strengths for the base stations included in the active set are below a threshold and the UE initiates a handover event 1A or 1C.

It is the UE that undertakes the action of increasing its output power and performs the further actions outlined below. Because the UE experiences the problems of reduced signal strength, the UE is in an immediate position to undertake actions without informing the base stations and receiving a command for increasing the output power, or other measures.

After sending the handover message, the power of the UE is returned to its previous value according to some embodiments of the invention. Again this is done locally in the UE, without involving the base stations.

Increasing the output power of the UE during transmission of the handover message increases the probability that the base station receives the message correctly in the up-link UL direction.

In some embodiments of the invention, the target SIR of the UE in the down-link DL direction is increased during a subsequent period of time. This results in the fact that the UE sends a number of increase power commands to the base stations until the new SIR level is matched, resulting in a significant reduction of the detection error probability of the DL handover response or acknowledgement and update message. The period of time may for example be the next 300-1000 ms, which is the typical round-trip-time between the handover message in the up-link UL direction to the handover response or acknowledgement in the down-link DL direction. Again the action is performed locally in the UE.

By increasing the up-link transmit power and, thus, reducing the probability of errors in the first handover message, a fewer number of retransmissions of the handover messages may be requested, implying shorter delays between the message for handover to the actual handover instant, which in turn reduces the risk of dropped calls. This is especially useful in cases where the signal level is weak and a delay in handover response might imply that the UE goes out-of-sync with the base stations comprised in the active set before the handover or active set update message is received.

In case the signal strengths for the BS:s in the active set are very weak and a fast handover is necessary, such as that a requested retransmission might give risk for the UE to go out-of-sync, a slight increase of the transmitted power when transmitting the handover message reduces the block error probability for that particular message significantly, for example from 1%, which may be a typical BLER target, to say 0.05%. Furthermore, by increasing the DL SIR reference after a handover message has been transmitted, the risk of detection error in the handover response message (active set update) is significantly reduced. Hence, the handover procedure is made much more robust and the risk of dropped calls have been reduced.

An increase in output power will normally increase the interference level experienced in the base station. However, the power increase is typically during a short period, for example during 20 ms, making the overall interference increase low. In the down-link direction, the average power use also increases due to the increase of the SIR reference during a short period of time, but again the increase is small compared to the achieved robustness of the system.

In the description below, focus is on the situation of soft handover in WCDMA, e.g. changes in the list of BS:s in the active set. However, the invention is not limited to that case. For example, the invention is equally applicable to hard handover events.

Figure 2:
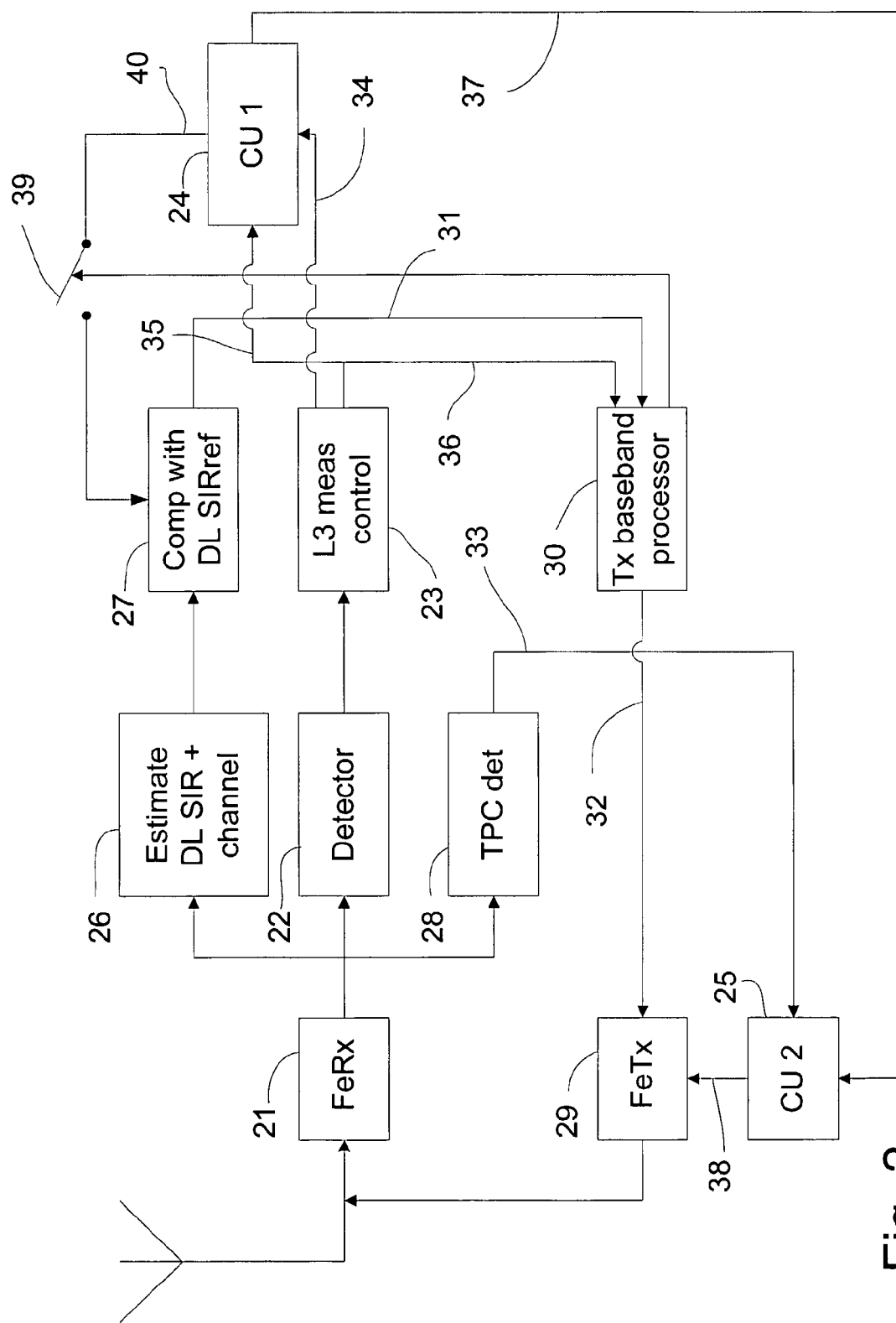
FIG. 2 is a block scheme of a first embodiment of the invention.

A block diagram of an embodiment of the invention appears from FIG. 2.

FIG. 2 discloses a UE in block form. The UE is shown in connected mode and continuously receives a radio signal from an antenna and downconverts the radio signal to a baseband signal in a front end receive unit 21 (Fe Rx). Moreover, the UE performs signal detection of user data as well as control information in a detection unit 22, as well as estimates the SIR and the channel response in unit 26. The UE compares the estimated SIR to the SIR reference in unit 27 in order to produce a DL TPC (DownLink Transmit Power Control) command signal to be transmitted in the UL and used for the DL power control of the BS output power. The DL TPC command signal is emitted from unit 27 on line 31 to a transmit baseband processor unit 30. The DL TPC command signal is passed on line 32 to the front end transmitter FeTx 29 and sent to the base stations in the active set for control of their power level during transmission.

Also TPC detection for controlling of the UE output power is done by the UE in a TPC detection unit 28 and the detected UL TPC command signal is forwarded on line 33 to a second control unit 25. The second control unit 25 controls the transmit power in front end transmit unit FeTx 29 by demanding an increase or decrease of the transmit power in dependence of whether the UL TPC signal is "one" or "zero". For performing these tasks any methods known in the art may be used.

The UE also performs numerous other tasks such as searching for new cells (cell search, not shown in the figures) and measuring the signal strength of all signals from base stations in an active set and a monitored set, for example in terms of signal to interference ratio SIR ($E_C/I_0$) or signal power $E_C$. The monitored set includes all base stations detected in a cell search, but which are not included in the active set. The measurements could be done in a Layer 3 (L3) measurement control unit 23. When the L3 measurement control unit for example measures a signal strength for a base station in the monitored set that is larger than one or more of the base stations in the active set, a handover event is triggered as explained above. The L3 measurement control unit 23 may pass a signal strength measurement signal on line 34 to a first control unit 24. Moreover, unit 23 may generate a handover event trigger signal which is passed to the first control unit 24 over line 35 and to the transmit baseband processor unit 30 via line 36. The handover event trigger signal may also include information about what type of handover that is triggered.

In the WCDMA soft handover case described above, there are three possible events, namely 1A, add a new cell to the active set, 1B, remove a cell from the active set or 1C, replace a cell in the active set.

There are also other types of handover events that are of importance in WCDMA. For instance, handover to base stations using another carrier frequency is also possible. It that case, soft handover is normally not possible and therefore hard handover is used. For interfrequency handover, the events 2A (a cell on the other carrier becomes stronger than the serving cell) and 2B (the cell on the other carrier becomes weaker than the serving cell) exist. The event 2A could be critical in the case when the serving cell is very weak and an interfrequency handover is necessary in order to maintain the call.

When an event is triggered, the handover event information as well as the signal strength measurements are passed over line 34 and 35 to the first control unit 24 that evaluates the importance of the handover. For instance, an event 1B, i.e. removal of a cell from the active set, is not critical from the UE point of view, since if the signal strength is low that information is not used in the data detection. Hence, the UE uses the information of the better cells in the active set instead. Furthermore, if the event is 1A or 1C and there are strong cells in the active set, the event is not critical, in the sense that the UE can still survive on the cells in the active set even if the handover is delayed due to erroneous reception of the handover message. Strong and weak cells might be based on a-priori knowledge on weak and strong signal strengths and can be stored in a look up table.

However, if the event is 1A or 1C and the signal strength for the strongest cell in the active set is below a certain threshold, indicating that a new strong cell should be included in the active set, in order to maintain the call, the event could be critical, and the transmission power may be increased during transmission of the handover message.

That information (Toggle UL power) is passed via line 37 from the first control unit 24 to the second control unit 25 that in turn controls the TX output power of unit 29 via line 38. The second control unit 25 increases the output power of the UE during the time frame the handover message is transmitted. The power increase could for example be 2-7 dB, the exact number can be based on experiments done beforehand and stored in a look-up table. The increase may also depend on whether a previous attempt to send a handover message has been made. By increasing the output power the probability of erroneous reception of the handover message in the base station is significantly reduced.

A method for increasing the output power is described below in more detail with reference to FIG. 4. To summarize, the method involves that the inner UL power control loop that controls the UE transmit power is opened or overridden. The UE takes over the control of the transmit power and increases it by some amount as indicated above. When the message has been transmitted, the first and second control units 24 and 25 resume normal operation and the transmit power is returned to normal levels as determined by the communication system.

After transmitting the handover message from the user equipment, which may take place in acknowledge mode, an answer should be generated and sent by the base station to the user equipment. This may also take place under increased power level from the base station in some embodiments of the invention. The transmit baseband processor unit 30 may be arranged to close a switch 39 in a line 40 between the first control unit 24 and the target SIR comparator unit 27. The first control unit 24 may issue a signal for increasing the SIR reference value in comparator unit 27, which results in that the unit 27 emits DL TPC command signals on line 31 for adapting the power level of the base station (-s) to the new SIR reference, which normally means that the base station increases its power level during transmission. The switch 39 is kept closed until the base station acknowledgement response has been received. If no response is received within an expected time period, which may be 400-1000 ms, the switch is opened, and the SIR reference level in unit 27 is returned to the normal value as established by the communication system. In this way, the reception of the response may be facilitated so that the risk of missing or losing a response may be minimized.

If an acknowledgement response is received, the response may comprise information about the handover operations to be carried out, such as information about the exact time instance when the new base stations is starting sending information to the UE and is prepared to receive information from the UE. Such a time instance may be specified and may be 50-300 ms after receipt of the response message. All elements in the system are then synchronized both at the end of the UE and at the end of the BS:s. In a hard handover situation, the information is switched from the first base station to the second base station at said time instance. The response message may include further information, such as adapting the power level of the UE and BS:s to the new situation at the instance of handover, for example based on measured pilot signal strengths or recent TPC commands in both the previous and new BS:s (see for example EP 1223769A).

Figure 3:
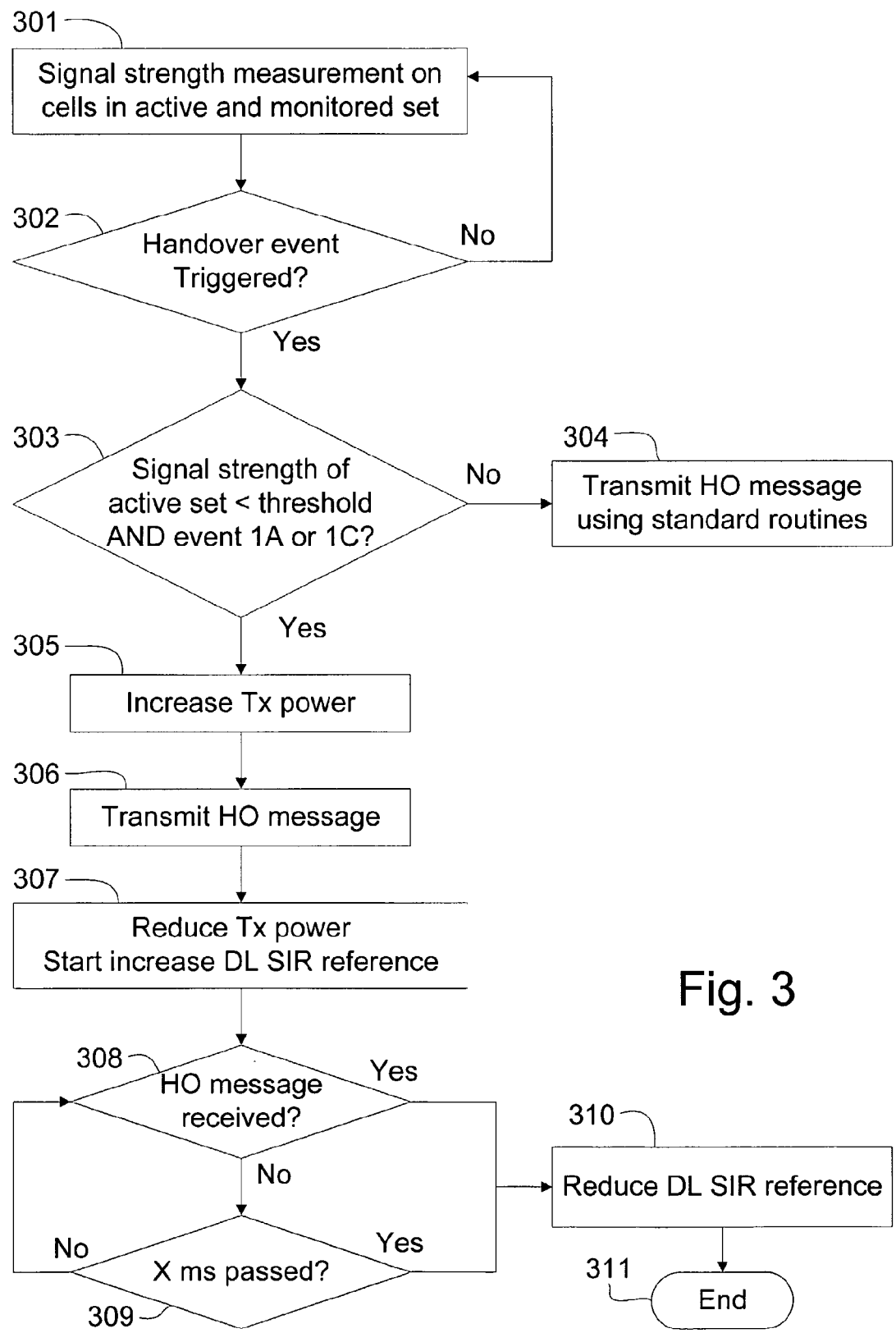
FIG. 3 is a flow diagram of method steps carried out according to an embodiment of the invention.

With reference to FIG. 3 there is shown a flow diagram illustrating method steps as performed according to some embodiments of the invention in case of a soft handover event.

In block 301, the signal strength is measured on all cells included in the active set and monitored set.

In block 302, a decision is taken if a handover event is triggered. If no, the control resumes to block 301. If yes, the control continues in block 303.

Block 303 is a decision block in which it is determined if the handover event is critical in the sense of some embodiments of the present invention.

In non-critical cases, handover messaging is done according to the standard procedures according to block 304.

However, if the event is critical, e.g. if it is an event 1A or 1C and the signal strength for the strongest cell in the active set is below a certain threshold, indicating that a new strong cell should be included in the active set, in order to maintain the call, the process proceeds to block 305. Such a threshold may be for example $E_C/I_0 < -14$ dB.

During the transmission of the handover message the transmit power of the UE should be increased as indicated in block 305.

When the handover message has been transmitted in block 306, the inner loop of the UL power control is closed again, and the UE resumes normal operation and follows the TPC commands. The UE transmit Tx power is reduced to normal operation levels 307.

At the same time as the UL goes into standard operation again, timing information is fed to the receiver part, which starts to increase the DL SIR reference level in block 307, for example 1-5 dB. Again the increase may be defined beforehand as in the UL. The increase of $SIR_{ref}$ may also be adaptive, depending on for example BLER and/or present $SIR_{ref}$.

In block 308 it is determined if the UE has received the handover response. If the response has been received, the DL SIR reference is reduced to the old SIR reference value in block 310.

If the HO response has not been received, it is determined, in block 309, if a predetermined time has passed, such as 400-1000 ms. If such time has not passed, the process continues to block 308. If the time period has passed, the DL SIR reference is reduced to the old value, in order to use no more power than necessary in the DL.

In the last-mentioned case, the UE can wait for a certain time period and then start the procedure once again, for example in block 305. The second time the UE could increase the power offset even more.

In block 303, the signal strength of the strongest base station is compared to a threshold. However, other criteria may apply, such as the fact that at least one or two base stations should be below said threshold. Another criteria may be that all base stations should be below a first, higher threshold, such as $<-4$ dB and at least one of the base stations should be below another, lower threshold, such as $<-14$ dB. The event could as well be event 2A mentioned above, or any other event.

Since the base station normally controls the transmission power in the UL direction, the UE works in open loop during transmission of the critical handover message according to embodiments of the present invention. One way to do that is shown by the block scheme in FIG. 4. This block scheme could for example be implemented as part of control unit 2 (25) of FIG. 2. The function of this block scheme is described by the example also shown in the same figure.

Figure 4:
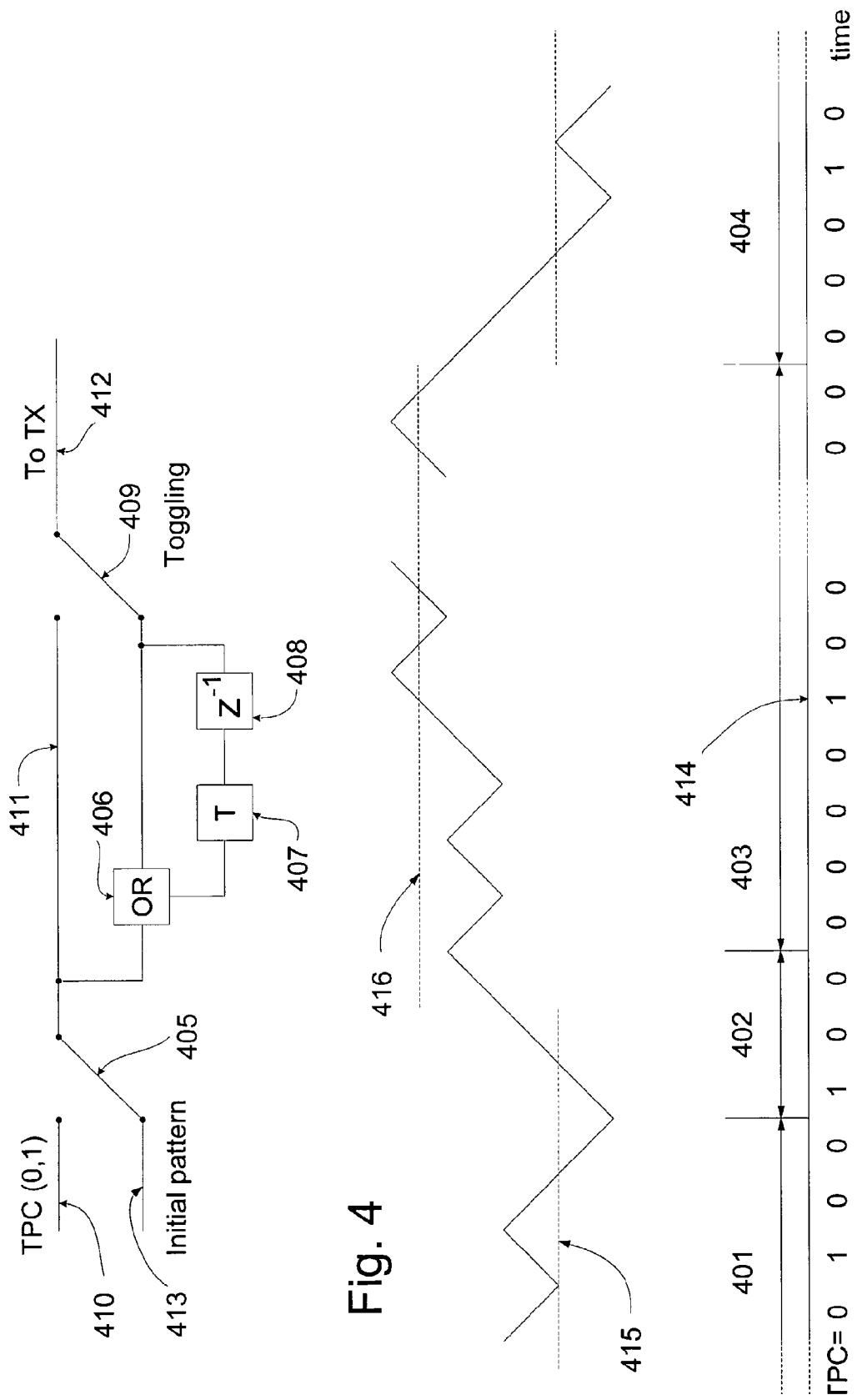
FIG. 4 is a diagram and block scheme describing the increase of the transmit power.

To the left in the example of FIG. 4, the UL power control is operating in normal mode, as indicated by arrow 401, i.e. the output power is increased if TPC=1 and decreased if TPC=0. The TPC signal is detected in TPC detection unit 28 and input there from at line 410 (corresponds to line 33 in FIG. 2) to a switch 405 labeled "initial pattern". Switch 405 normally forwards the TPC signal 410 to line 411 and to a second switch 409 labeled "toggling". Switch 409 normally forwards the TPC signal to line 412 (corresponds to line 38 in FIG. 2) and further to the front end transmitter unit FeTx 29. During normal operation, the transmit power typically toggles around a value as indicated by the broken line 415 as shown during time period 401. This toggling is controlled by the base station and the UL SIR reference value in said base station.

At a certain time instant between times 401 and 402, a critical handover message is triggered and the switch "initial pattern" 405 is turned "on" to the position shown in FIG. 4, which means that the power control is interrupted and thus, the inner loop is opened. The operation of the switch may take place by a signal from the first control unit 24 transmitted on line 37 to the second control unit 25. Instead, a signal "Initial pattern" is generated on a line 413. The signal comprises a number of TPC commands of TPC=1 sufficient for increasing the power level of the transmit signal to the desired value. If e.g. each TPC command increases the transmit power by one decibel and the signal strength should be increased by 5 dB, the "initial pattern" signal comprises 5 "ones". The "initial pattern" signal may be generated by the second control unit 25.

This "initial pattern" signal on line 413 is controlling the Tx power during time period 402 and the output power is increased to a certain level, independently of the received TPC commands at line 410.

Then, the "initial pattern" switch 405 is turned off, for example by a signal from control unit 24, connecting line 410 to line 411, and "toggling" switch 409 is turned on to the position shown in FIG. 4. Now the UL inner loop power control works in open loop during the time period shown by arrow 403.

The "toggling" switch 409 may be turned on already at the same time as the "initial pattern" switch 405 was turned on (the positions shown in FIG. 4).

During the handover up-link message the output power of the UE toggles around the new power level and does not follow TPC "down" commands. Normally, the TPC signal indicates down (TPC=0) during this operation, since the base station detects that the UE transmits with excessive power, and attempts to decrease the power. However, if the TPC indicates "UP" (TPC=1), the UE again increases the power as can be seen in the example at time instant 414. Hence, the UE increases the transmit power to a new level indicated by line 416 in FIG. 4.

During the HO message the output power should be kept substantially constant. However, since only power up or down exists in WCDMA, one solution to keep the output power constant is to toggle the output power around the new power level as shown in FIG. 4. Thus, the power is toggled around a power level, such as level 416, and possibly increased but never decreased under the open loop condition described in the embodiment of FIG. 4.

The method of "toggling but follow up" command can be implemented as a combination of "OR" 406, toggle 407, which is in effect a NOT function or inverting function, and delay 408 elements as shown in FIG. 4 according to the equation:

$$PCC(t) = \{\{NOT\{PCC(t-1)\}\}OR\{TPC(t)\}\}$$

where PCC(t)=Power Control command to Tx at time t where "1" means Tx power up, and "0" means Tx power down, NOT{.} means logical complement, and {.}OR{.} means logical OR (output=1 if any input=1).

When the handover message has been transmitted after time period 403, the "toggling" switch 409 is turned off, which may take place under the control of the first control unit 24 and the UL power control resumes its closed loop control, which may involve that the transmit power returns to the old average Tx level during time period 404.

As indicated above, the SIR reference value in the UE could then be increased so that the base station transmit power is increased during a time period sufficient for receiving an acknowledgement message and a message that the handover has been completed.

To summarize, first, the UE opens the inner power control loop and takes over the control of the transmit power during a first time period (which may be approximately 20 ms) during which a handover message is sent from the UE to the BS. Then the control is resumed by the inner control loop.

The control is taken over shortly before sending the message and/or during sending of the message. During the take over of the control, the user equipment may immediately increase the transmit power of the UE. However, in some embodiments, the power may be increased after performing some other actions, such as controlling the type of message and other circumstances. The increase may take place during sending of the message, since the message comprises error correction, which may correct the message even if the start of the message comprises errors. At least a portion of the handover message should be sent at an increased power level in order to increase the probability that the message is received in a decodable condition.

The increase may take place in several steps, as shown in FIG. 4, or in a single, large increase of the transmit power.

After sending the handover message, normal operation is resumed. Such normal operation can be resumed as soon as possible after sending the message. However, in some embodiments, the transmit power may be maintained for a longer time period, for example if several messages are to be sent. In some embodiments, the normal operation is not resumed until one or several messages have been sent and some further time has elapsed, for example giving the UE time to make some further control or other actions.

When the handover message is sent in acknowledge mode, normal operation is resumed before the base station sends an acknowledge message or a response message. During the period when the UE sends with increased transmission power, the UE disturbs the other messages, including the response message. However, if the power level is resumed, i.e. normally lowered, before the base station sends the response message, the probability that the response message is received in a decodable condition will be increased. Thus, the power level is resumed at least within 100 ms after the termination of sending the handover message. The power level may as well be resumed before the termination of the handover message, such as 5 ms before the termination, as long as at least a portion of the handover message is sent at an increased power level.

Optionally, the UE then increases the DL SIR reference value, so that the base station is controlled to increase it's transmit power, during a second time period (which may have a length of approximately 400-1000 ms) so that the acknowledgement message sent by the BS:s may be safely detected by the UE. The increase of the DL SIR reference value may be undertaken directly after sending the handover message. In some embodiments, the SIR reference increase can also be initiated during the sending of the handover message or even at the same time as the UE increases it's transmit power. The SIR reference increase may even be initiated after a certain time period has passed since the take over of the control for increasing the transmit power. In some other embodiments, the SIR reference increase is initiated after some further delay, after sending the handover message, for example giving time to the base station to perform some actions, for example checking the type of message etc. Such a delay may be 100-300 ms after terminating the handover message. If several handover messages are sent, one or all of the acknowledgement messages can be sent and/or received while the base station is sending at increased power level. The base station is returned to original power level when the exchange of messages is finished or after a predetermined maximum time period.

Both actions, increase of UE transmit power and increase of SIR reference value, are performed without involving the base station. This means that less control messages need to be sent in the system. Since such control messages may be lost or misinterpreted if the signal strengths are low, the present approach with the UE determining the actions means a more robust operation.

Figure 5:
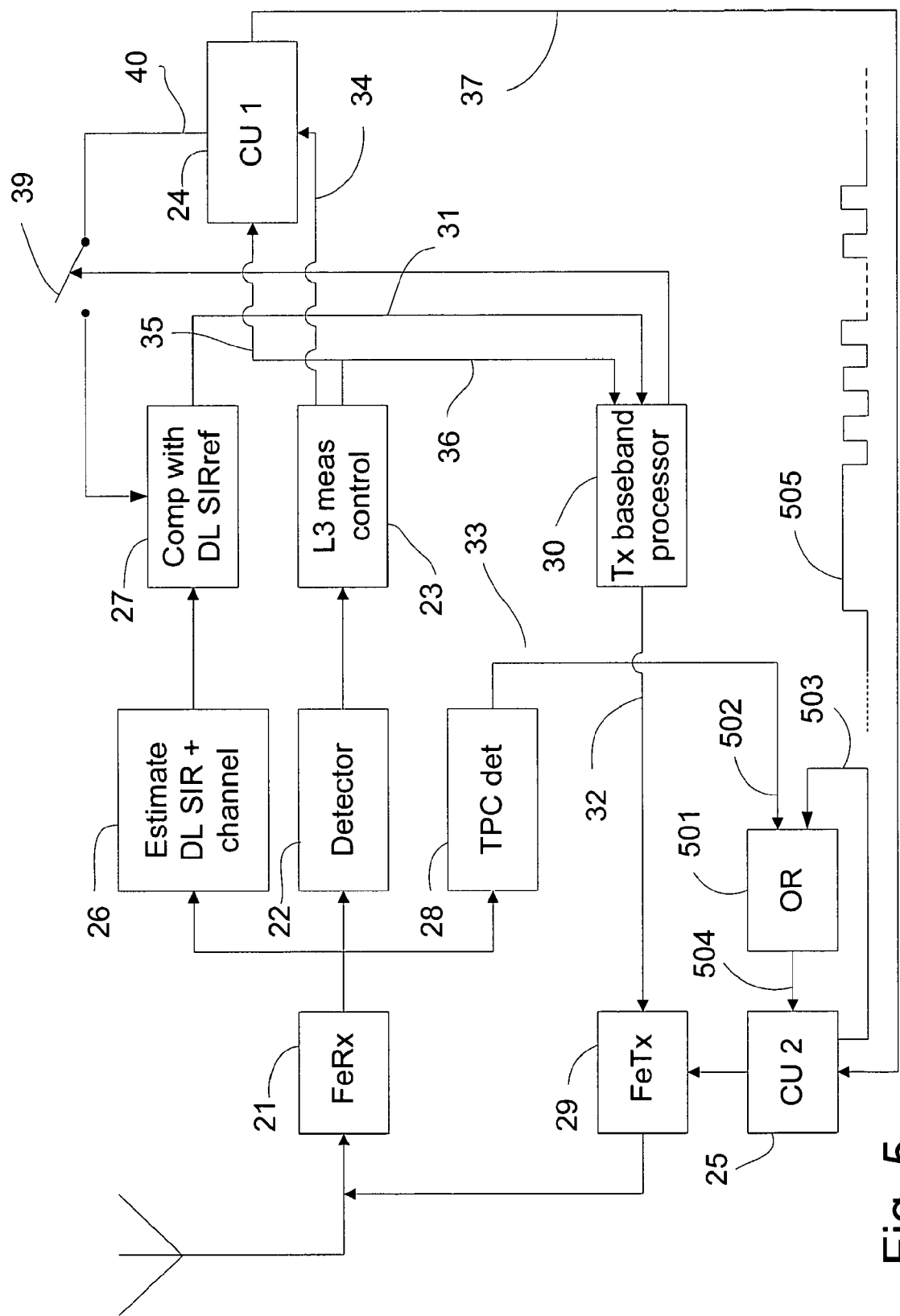
FIG. 5 is a diagram similar to FIG. 2 of another embodiment.

FIG. 5 depicts another embodiment for overriding or ignoring the power control commands in the UE in order to increase the transmit power. An OR-gate 501, having two inlet terminals 502, 503 and one output terminal 504, is inserted in the line 33 connecting the TPC detection unit 28 with the second control unit 25 in the embodiment shown in FIG. 2. The second inlet terminal 503 is connected to a circuit generating a signal 505 as shown in FIG. 5. The generating circuit may be control unit 25 as shown. As soon as the second input terminal 503 is "one", the UE is in open loop and ignores the power control commands. The transmit power will increase during the initial time the input terminal is high, such as 6 dB. Then, the second input terminal 503 toggles between "one" and "zero", which means that the transmit power also will toggle up and down and be maintained at a substantially constant level. However, if the first input terminal 502 is "one", the transmit power will increase independently of the state of the second input terminal 503. Thus, the operation of the embodiment of FIG. 5 is substantially the same as the embodiment shown in FIG. 4.

The base station can increase its power during sending of an acknowledgment message or event message in other ways. The message sent by the UE in acknowledgement mode may include an indication that the reply should be sent with an increased power by the base station, which is programmed to act accordingly. Alternatively, the base station can be programmed to always reply with increased power at this type of messages.

The method of increasing the transmit power of the UE during the sending of an important message can be used in other types of activities than during sending of a soft handover event message. Such other activities may be hard handover, UE identification messages, and Random Access procedures.

The method of the invention may be performed in software or hardware or a combination thereof in the UE and the BS.

Base stations may as well be denoted as Node B in UMTS.

The present invention may be useful in portable or hand-held electronic devices, such as in a mobile radio terminal, a pager, a communicator, an electronic organizer, a smart-phone, or a personal digital assistant.

It should be emphasized that the term "comprises/comprising" when used in this specification is taken to specify the presence of stated features, integers, steps or components but does not preclude the presence or addition of one or more other features, integers, steps, components or groups thereof.

The present invention has been described above with reference to specific embodiments. However, other embodiments than those described above are possible within the scope of the invention. Different method steps than those described above may be provided within the scope of the invention. The different features and steps of the invention may be combined in other combinations than those described. The scope of the invention is only limited by the appended patent claims, and any reasonable equivalents thereof.

The invention claimed is:

1. A method for controlling a transmit power of a mobile user equipment being in radio communication with at least one base station of a wireless communication system, wherein the transmit power of the user equipment is normally controlled by the communication system via power control commands, the method comprising:

in response to ascertaining that a handover event has been triggered, conditionally overriding said power control commands from the base station, wherein overriding said power control commands from the base station comprises increasing the transmit power emitted by the user equipment before or during sending of a handover message to a base station, the handover message requesting an action in the communication system and requiring a response from the base station, said increasing being performed by the user equipment irrespective of said power control commands from the base station, and resuming normal operation in the user equipment before performing said requested action, wherein normal operation comprises controlling the transmit power of the user equipment in accordance with the power control commands of the communication system, wherein the transmit power of the user equipment is, during normal operation in the user equipment, controlled by a closed loop power control system, arranged so that the transmission results in a signal-to-interference ratio value equal to a target signal-to-interference ratio value;

the method further comprises:

adjusting the closed loop power control system into an open loop power control system, for increasing the transmit power during said overriding of said power control commands from the base station, wherein the power control system emits power control signals for increasing or decreasing the power emitted by the user equipment, and the method further comprises:

generating, by the user equipment, a number of power increase signals, in order to initially increase the transmit power during open loop control.

2. The method of claim 1, wherein the handover message requests a soft handover event.

3. The method of claim 1, wherein the handover message requests a hard handover event.

4. The method of claim 1, further comprising:

said overriding said power control commands including generating a toggling signal of alternating increase and decrease signals after the initial increase of the transmit power, for maintaining the transmit power at a substantially constant value.

5. The method of claim 1, wherein the open loop system causes an increase of the transmit power in response to reception of an increase signal from the base station but fails to cause a decrease of the transmit power in response to reception of a decrease signal from the base station.

6. The method of claim 1, further comprising:
increasing a power level transmitted by a base station during a time period following sending of the handover message.

7. The method of claim 6, in which said increase of the power level transmitted by the base station is returned to the original power level after receipt of the response or after a predetermined maximum time period.

8. The method of claim 1, wherein said communication system is a Code Division Multiple Access system or a Wideband Code Division Multiple Access system.

9. The method of claim 1, wherein said increase of the transmit power is performed if the signal strength of at least one base station in communication with said user equipment is below a threshold value.

10. The method of claim 1, wherein said increase of the transmit power is performed if the signal strengths of at least two base stations in communication with said user equipment are below a threshold value.

11. The method of claim 1, wherein said increase of the transmit power is performed if the signal strengths of all of the base stations in communication with said user equipment are below a threshold value.

12. The method of claim 1, in which said user equipment comprises a list of active base stations which are in communication with said user equipment, and wherein
said increase of the transmit power is performed if said handover message is a handover message for adding a base station to said list of active base stations.

13. The method of claim 1, in which said user equipment comprises a list of active base stations which are in communication with said user equipment, and wherein
said increase of the transmit power is performed if said handover message is a handover message for a combined addition and removal of a base station to said list of active base stations.

14. A method for controlling a transmit power of a mobile user equipment being in radio communication with at least one base station of a wireless communication system, wherein the transmit power of the user equipment is normally controlled by the communication system via power control commands,
the method comprising:
in response to ascertaining that a handover event has been triggered, conditionally overriding said power control commands from the base station, wherein overriding said power control commands from the base station comprises increasing the transmit power emitted by the user equipment before or during sending of a handover message to a base station, the handover message requesting an action in the communication system and requiring a response from the base station, said increasing being performed by the user equipment irrespective of said power control commands from the base station, and
resuming normal operation in the user equipment before performing said requested action, wherein normal operation comprises controlling the transmit power of the user equipment in accordance with the power control commands of the communication system;
wherein the method further comprises:
increasing a power level transmitted by a base station during a time period following sending of the handover message; and increasing, by the user equipment, a target signal-to-interference ratio value, for increasing the power level transmitted by the base station.

15. The method of claim 14, in which said target signal-to-interference ratio value is increased by a predetermined amount.

16. The method of claim 14, in which said target signal-to-interference ratio value is increased adaptively, depending on at least one of a Bit Error Rate, a Block Error Rate, and the present target signal-to-interference ratio value.

17. The method of claim 14, wherein the handover message requests a soft handover event.

18. The method of claim 14, wherein the handover message requests a hard handover event.

19. The method of claim 14, wherein said increase of the transmit power is performed if the signal strength of at least one base station in communication with said user equipment is below a threshold value.

20. The method of claim 14, wherein said increase of the transmit power is performed if the signal strengths of at least two base stations in communication with said user equipment are below a threshold value.

21. The method of claim 14, wherein said increase of the transmit power is performed if the signal strengths of all of the base stations in communication with said user equipment are below a threshold value.

22. A device for controlling a transmit power of a mobile user equipment being in communication with at least one base station of a wireless communication system, wherein the transmit power of the user equipment is normally controlled by the communication system via power control commands, comprising:
a power control unit for, in response to ascertaining that a handover event has been triggered, conditionally overriding said power control commands from the base station, wherein overriding said power control commands from the base station comprises increasing the transmit power emitted by the user equipment before or during sending of a handover message to a base station, the handover message requesting an action in the communication system and requiring a response from the base station, said increasing being performed by the user equipment irrespective of said power control commands from the base station; and for resuming normal operation in the user equipment before performing said requested action, wherein normal operation comprises controlling the transmit power of the user equipment in accordance with the power control commands of the communication system;
wherein said power control system for control of the transmit power of the user equipment controls the power in a closed loop circuit during normal operation in the user equipment;
and the device further comprises
a switch unit for opening the loop of the closed loop power control system,
wherein the switch unit comprises:
a first switch for opening the closed loop and increasing the transmit power; and
a second switch for maintaining the increased power during a time sufficient for sending the handover message.

23. The device of claim 22, wherein the handover message is a message requesting a soft handover event.

24. The device of claim 22, wherein the handover message is a message requesting a hard handover event.

25. The device of claim 22, further comprising:
a toggling device for emitting toggling signals for toggling the transmit power up and down around the increased transmit power.

26. The device of claim 22, wherein the closed loop power control system comprises:
a receiver circuit for receiving a power control signal from a base station;
a control circuit for increasing or decreasing the transmit power of the user equipment in dependence of the power control signal.

27. The device of claim 26, wherein the control circuit for increasing the transmit power comprises a generator circuit for generating a number of power increase signals for increasing the transmit power of the user equipment.

28. The device of claim 22, further comprising
a power control unit for increasing a power level transmitted by a base station during a time period following sending of the handover message.

29. The device of claim 28, in which said power control unit is arranged to return the power level transmitted by the base station to the original power level after receipt of the response message or after a predetermined maximum time period.

30. The device of claim 22, wherein said communication system is a Code Division Multiple Access system or a Wideband Code Division Multiple Access system.

31. The device of claim 22, wherein said power control unit is arranged to increase the transmit power if the signal strength of at least one base station in communication with said user equipment is below a threshold value.

32. The device of claim 22, wherein said power control unit is arranged to increase the transmit power if the signal strengths of at least two base stations in communication with said user equipment are below a threshold value.

33. The device of claim 22, wherein said power control unit is arranged to increase the transmit power if the signal strengths of all of the base stations in communication with said user equipment are below a threshold value.

34. The device of claim 22, in which said user equipment comprises a list of active base stations which are in communication with said user equipment, and wherein
said power control unit is arranged to increase the transmit power if said handover message is a handover message for adding a base station to said list of active base stations.

35. The device of claim 22, in which said user equipment comprises a list of active base stations which are in communication with said user equipment, and wherein
said power control unit is arranged to increase the transmit power if said handover message is a handover message for a combined addition and removal of a base station to said list of active base stations.

36. A device for controlling a transmit power of a mobile user equipment being in communication with at least one base station of a wireless communication system, wherein the transmit power of the user equipment is normally controlled by the communication system via power control commands, comprising:
a power control unit for, in response to ascertaining that a handover event has been triggered, conditionally overriding said power control commands from the base station, wherein overriding said power control commands from the base station comprises increasing the transmit power emitted by the user equipment before or during sending of a handover message to a base station, the handover message requesting an action in the communication system and requiring a response from the base station, said increasing being performed by the user equipment irrespective of said power control commands from the base station; and for resuming normal operation in the user equipment before performing said requested action, wherein normal operation comprises controlling the transmit power of the user equipment in accordance with the power control commands of the communication system;
wherein said power control system for control of the transmit power of the user equipment controls the power in a closed loop circuit during normal operation in the user equipment;
and the device further comprises
a switch unit for opening the loop of the closed loop power control system; and
a toggling circuit for maintaining the increased power during a time sufficient for sending the message, the toggling circuit comprising a delay circuit, a NOT circuit and an OR circuit.

37. A device for controlling a transmit power of a mobile user equipment being in communication with at least one base station of a wireless communication system, wherein the transmit power of the user equipment is normally controlled by the communication system via power control commands, comprising:
a power control unit for, in response to ascertaining that a handover event has been triggered, conditionally overriding said power control commands from the base station, wherein overriding said power control commands from the base station comprises increasing the transmit power emitted by the user equipment before or during sending of a handover message to a base station, the handover message requesting an action in the communication system and requiring a response from the base station, said increasing being performed by the user equipment irrespective of said power control commands from the base station; and for resuming normal operation in the user equipment before performing said requested action, wherein normal operation comprises controlling the transmit power of the user equipment in accordance with the power control commands of the communication system,
a power control unit for increasing a power level transmitted by a base station during a time period following sending of the handover message,
a register in the user equipment including a target signal-to-interference ratio value, and
a control unit for increasing the power level transmitted by the base station by increasing the target signal-to-interference ratio value.

38. The device of claim 37, in which said target signal-to-interference ratio value is increased by a predetermined amount.

39. The device of claim 37, in which said target signal-to-interference ratio value is increased adaptively, depending on at least one of a Bit Error Rate, a Block Error Rate, and the present target signal-to-interference ratio value.

40. A non-transitory computer readable medium having stored therein a computer program product comprising computer program code means to execute a method when the computer program code means is run by an electronic device having computer capabilities, said method being for controlling a transmit power of a mobile user equipment being in radio communication with at least one base station of a wireless communication system, wherein the transmit power of the user equipment is normally controlled by the communication system via power control commands, and said method comprising:

- in response to ascertaining that a handover event has been triggered, conditionally overriding said power control commands from the base station, wherein overriding said power control commands from the base station comprises increasing the transmit power emitted by the user equipment before or during sending of a handover message to a base station, the handover message requesting an action in the communication system and requiring a response from the base station, said increasing being performed by the user equipment irrespective of said power control commands from the base station, and
- resuming normal operation in the user equipment before performing said requested action, wherein normal operation comprises controlling the transmit power of the user equipment in accordance with the power control commands of the communication system,
- wherein the transmit power of the user equipment is, during normal operation in the user equipment, controlled by a closed loop power control system, arranged so that the transmission results in a signal-to-interference ratio value equal to a target signal-to-interference ratio value; and
- the method further comprises:
- adjusting the closed loop power control system into an open loop power control system, for increasing the transmit power during said overriding of said power control commands from the base station,
- wherein the power control system emits power control signals for increasing or decreasing the power emitted by the user equipment, and the method further comprises:
- generating, by the user equipment, a number of power increase signals, in order to initially increase the transmit power during open loop control.

41. A non-transitory computer readable medium having stored therein a computer program product comprising computer program code means to execute a method when the computer program code means is run by an electronic device having computer capabilities, said method being for controlling a transmit power of a mobile user equipment being in radio communication with at least one base station of a wireless communication system, wherein the transmit power of the user equipment is normally controlled by the communication system via power control commands, and said method comprising:

- in response to ascertaining that a handover event has been triggered, conditionally overriding said power control commands from the base station, wherein overriding said power control commands from the base station comprises increasing the transmit power emitted by the user equipment before or during sending of a handover message to a base station, the handover message requesting an action in the communication system and requiring a response from the base station, said increasing being performed by the user equipment irrespective of said power control commands from the base station, and
- resuming normal operation in the user equipment before performing said requested action, wherein normal operation comprises controlling the transmit power of the user equipment in accordance with the power control commands of the communication system,
- wherein the method further comprises:
- increasing a power level transmitted by a base station during a time period following sending of the handover message; and
- increasing, by the user equipment, a target signal-to-interference ratio value, for increasing the power level transmitted by the base station.

\* \* \* \* \*

UNITED STATES PATENT AND TRADEMARK OFFICE
CERTIFICATE OF CORRECTION

PATENT NO. : 8,009,595 B2
APPLICATION NO. : 11/721674
DATED : August 30, 2011
INVENTOR(S) : Lindoff et al.

Page 1 of 1

It is certified that error appears in the above-identified patent and that said Letters Patent is hereby corrected as shown below:

On the title page item (58) Field of Classification Search should read: None.

On Page 2, item (56) under "OTHER PUBLICATIONS", in Column 2, Line 1, delete "UTMS" and insert -- UMTS --, therefor.

In Fig. 4, Sheet 4 of 5, delete " " and insert -- --, therefor.

In Column 1, Line 57, delete "FCL PC." and insert -- FCLPC --, therefor.

Signed and Sealed this
Sixth Day of March, 2012

David J. Kappos
*Director of the United States Patent and Trademark Office*